(12) United States Patent
Liao et al.

(10) Patent No.: US 6,669,750 B2
(45) Date of Patent: Dec. 30, 2003

(54) ACCESS PORT FOR HOUSE VACUUM EQUIPPED WITH REMOVABLE TRAP

(75) Inventors: Jason Liao, Yunlin (TW); Yeay-Cin Chen, Hsinchu (TW); Jun-Sheng Hsu, Taipei (TW); Wan-ly Chen, Suao Jen. Ilan (TW)

(73) Assignee: Taiwan Semiconductor Manufacturing Co., Ltd, hsin chu (TW)

( * ) Notice: Subject to any disclaimer, the term of this patent is extended or adjusted under 35 U.S.C. 154(b) by 84 days.

(21) Appl. No.: 09/996,404

(22) Filed: Nov. 20, 2001

(65) Prior Publication Data

US 2003/0093980 A1 May 22, 2003

(51) Int. Cl.[7] .......................... B01D 33/15; B01D 46/12
(52) U.S. Cl. .......................... 55/385.1; 55/323; 55/329; 55/392; 55/429; 96/400; 96/421; 454/354
(58) Field of Search .................. 55/323, 329, 385.1, 55/385.2, 357, 392, 413, 429; 96/253, 400, 421; 454/354

(56) References Cited

U.S. PATENT DOCUMENTS 4,615,812 A * 10/1986 Darling ...................... 210/805
5,353,949 A * 10/1994 Seibert et al. ............... 220/371
5,846,274 A * 12/1998 Smelser ...................... 55/385.2
6,093,228 A * 7/2000 Wang ......................... 55/385.1
6,248,232 B1 * 6/2001 Stoner ........................ 210/136
6,346,042 B1 * 2/2002 Parker ........................ 55/385.2
6,540,804 B1 * 4/2003 Wennerström ............. 55/385.1

* cited by examiner

Primary Examiner—Blaine Copenheaver
Assistant Examiner—Minh-Chau T. Pham
(74) Attorney, Agent, or Firm—Tung & Associates

(57) ABSTRACT

An access port for a house vacuum system that is equipped with a removable trap is described. The access port can be constructed by the components of a port body of elongated, cylindrical shape, which may have either an annular cross-section or a rectangular cross-section; a port cover that is pivotally connected to a floor panel by a hinge; a debris trap of elongated, cylindrical shape that is removable mounted inside the port body; a vacuum hose access port that is provided in the port cover; and a cover for the vacuum hose access port pivotally connected to the port cover by a hinge. The access port may also be made into a portable unit that can be moved from vacuum port to vacuum port in a cleanroom environment.

17 Claims, 2 Drawing Sheets

ACCESS PORT FOR HOUSE VACUUM EQUIPPED WITH REMOVABLE TRAP

FIELD OF THE INVENTION

The present invention generally relates to an access port for a house vacuum system used in a semiconductor fabrication facility and more particularly, relates to an access port for a house vacuum system that is equipped with a removable trap for preventing the access port from being plugged up by the vacuumed debris.

BACKGROUND OF THE INVENTION

In the recent development of semiconductor fabrication technology, the continuous miniaturization in device fabricated demands more stringent requirements in the fabrication environment and contamination control. When the feature size was in the 2 µm range, a cleanliness class of 100–1000 (which means the number of particles at sizes larger than 0.5 µm per cubic foot) was sufficient. However, when the feature size is reduced to 0.25 µm, a cleanliness class of 0.1 is required. It has been recognized that an inert mini-environment may be the only solution to future fabrication technologies when the device size is reduced further. In order to eliminate micro-contamination and to reduce native oxide growth on silicon surfaces, the wafer processing and the loading/unloading procedures of a process tool must be enclosed in an extremely high cleanliness mini-environment that is constantly flush with ultrapure nitrogen that contains no oxygen and moisture.

Different approaches in modern cleanroom design have been pursued in recent years with the advent of the ULSI technology. One is the utilization of a tunnel concept in which a corridor separates the process area from the service area in order to achieve a higher level of air cleanliness. Under the concept, the majority of equipment maintenance functions are conducted in low-classified service areas, while the wafers are handled and processed in more costly high-classified process tunnels. For instance, in a process for 16M and 64M DRAM products, the requirement of contamination control in a process environment is so stringent that the control of the enclosure of the process environment for each process tool must be considered. This stringent requirement creates a new mini-environment concept which is shown in FIG. 1A. Within the enclosure of the mini-environment of a process tool 10, an extremely high cleanliness class of 0.1 (which means the number of particles at sizes larger than 0.1 µm per cubic foot) is maintained, in contrast to a cleanliness class of 1000 for the overall production cleanroom 12. In order to maintain the high cleanliness class inside the process tool 10, the loading and unloading sections 14 of the process tool must be handled automatically by an input/output device such as a SMIF (standard mechanical interfaces) apparatus. A cassette or wafer can be transported into the process tool 10 by SMIF pod 18 situated on top of the SMIF apparatus 20.

Also provided in the cleanroom 12 is a house vacuum system equipped with a vacuum access port 40 shown in FIGS. 1A–1C. The vacuum access port 40 is constructed by a vacuum conduit 42 and a cover assembly 44. The house vacuum system is provided with the vacuum access port 40 throughout a cleanroom, which is normally installed in the cleanroom floor such that a top surface of the cover assembly 44 is flush with the top surface 32 of the cleanroom floor. The purpose of the house vacuum system is to provide ready access to a factory vacuum source for cleaning of process tools or work areas. The vacuum conduit 42 is provided with an apertured plate 50 with a plurality of apertures 52 therein for filtering out or stopping large debris that are vacuumed into the conduit 42.

The cover assembly 44 for the vacuum access port 40 is shown in detail in FIG. 1B in a perspective view. The cover assembly 44 is normally provided with a recess 34 in a top surface 36 of the cover assembly 44. The recess 34 is further provided with a pin 38 for grasp by a pair of pincers during a preventive maintenance procedure. The cover assembly 44 is constructed by an upper portion 46 and a lower portion 48 that are both formed in an annular shape. The outside diameter of the lower portion 48 is only slightly smaller than the inside diameter of the conduit 42 such that a snug fit can be achieved for a vacuum-tight seal. FIG. 1C illustrates a cross-sectional view of the cover assembly 44 installed in the vacuum conduit 42.

The cover assembly 44 illustrated in FIGS. 1A–1C serves the purpose of sealing a vacuum outlet 40. However, whenever an operator needs to use the house vacuum by attaching a vacuum hose connector to the conduit 42, a pair of pincers or Allen wrench must be used to pick up the cover assembly 44 by the pin 38. This process must be repeated several times a day whenever a process chamber, or a work area needs to be cleaned. Moreover, the apertured plate 50 used in the vacuum conduit 42 for filtering out the debris from vacuuming can be easily plugged up such that the vacuum operation cannot be efficiently conducted. The plurality of apertures 52 in the apertured plate 50 can be easily jammed or blocked by the debris picked up during vacuuming. The removal of the debris from cavity 54 is inconvenient and awkward to access. Major improvements to the conventional vacuum conduit system and the vacuum access port are therefore needed for providing easy access to the house vacuum in a cleanroom.

It is therefore an object of the present invention to provide an access port for a house vacuum system that does not have the drawbacks or shortcomings of the conventional access ports.

It is another object of the present invention to provide an access port for a house vacuum system that is equipped with a removable trap for easier removal of vacuumed debris.

It is a further object of the present invention to provide an access port for a house vacuum system that includes a hinged cover for easier access.

It is another further object of the present invention to provide a portable vacuum access port for a house vacuum system wherein the access port protrudes above the floor panel.

It is still another object of the present invention to provide a vacuum access port for a house vacuum system equipped with a removable trap provided with a plurality of apertures both in a bottom and in a sidewall of the trap.

SUMMARY OF THE INVENTION

In accordance with the present invention, an access port for a house vacuum system that is equipped with a removable trap is disclosed.

In a preferred embodiment, an access port for a house vacuum system that is equipped with a removable trap is provided which includes a port body of elongated, cylindrical shape that has an open top and an apertured bottom in fluid communication with a vacuum source; a port cover pivotally connected to a floor panel by hinge means, the port cover has an outer dimension that is at least the outer dimension of the port body for sealingly engaging an upper rim of the port body when the port cover is in a closed position; a debris trap of elongated, cylindrical shape removably mounted inside the port body for collecting debris from a vacuuming operation and for allowing air to pass therethrough through a plurality of apertures provided in a sidewall and in a bottom plate of the debris trap; and a vacuum hose access means in the port cover for sealingly connecting a vacuum hose to a vacuum source.

In the access port for a house vacuum system, the vacuum hose access means may include a vacuum hose access port in the port cover and a cover for the vacuum hose access port pivotally connected to the port cover by a hinge means. The vacuum hose access port may be equipped with a downwardly projecting sidewall for frictionally engaging an outer peripheral surface of a vacuum hose when the cover for the access port is pivotally opened. The vacuum hose access means may further include a vacuum hose access port in the port cover and a cover for sealing the vacuum hose access port when the vacuum hose is not in use. The vacuum hose access port may be formed of an opening and an upwardly extending sidewall that has an inner peripheral surface for frictionally engaging a vacuum hose.

The present invention is further directed to an access port for a house vacuum system that is equipped with a removable trap which includes a port body of elongated, cylindrical shape that has an open top and an apertured bottom in fluid communication with a vacuum source; a port cover pivotally connected to a floor panel by hinge means, the port cover may have an outer dimension that is at least the outer dimension of the port body for sealingly engaging an upper rim of the port body when the port cover is in a closed position; a debris trap of elongated, cylindrical shape removably mounted inside the port body for collecting debris for a vacuuming operation and for allowing air to pass therethrough through a plurality of apertures provided in a sidewall and in a bottom plate of the debris trap; a vacuum hose access port in the port cover; and a cover for the vacuum hose access port pivotally connected to the port cover by a hinge means, the access port may be equipped with a downwardly projecting sidewall for frictionally engaging an outer peripheral surface of a vacuum hose when the cover for the access port is pivotally opened, the cover for the vacuum access port may have a diameter smaller than an outer dimension of the port cover.

In the access port for a house vacuum system that is equipped with a removable trap, the port body and the debris trap may have an annular cross-section, the outer dimension of the port cover may be a diameter of the port cover. The port body may further include a flange portion on an inner periphery of the port body for suspendedly supporting an upper flange of the debris trap. The debris trap may be equipped with an outwardly extending upper flange portion extended from an upper rim of the trap. The debris trap may be supported in a suspended manner spaced-apart from an inner periphery and the apertured bottom of the port body by a distance of at least 0.5 cm. The debris trap may further include a handle for ease of removal from the port body. The downwardly projecting sidewall on the vacuum hose access port may further include a stop mounted on an inner periphery of the sidewall to limit the downward travel of a vacuum hose.

The present invention is still further directed to an access port for a house vacuum system that is equipped with a removable trap which includes a port body of elongated, cylindrical shape that has an open top and an apertured bottom in fluid communication with a vacuum source; a port cover that is pivotally connected to a floor panel by hinge means, the port cover may have an outer dimension that is at least the outer dimension of the port body for sealingly engaging an upper rim of the port body when the port cover is in a closed position; a debris trap of elongated, cylindrical shape that is removably mounted inside the port body for collecting debris from a vacuuming operation and for allowing air to pass therethrough through a plurality of apertures provided in a sidewall and in a bottom plate of the debris trap; a vacuum hose access port in the port cover formed by an opening and an upwardly extending sidewall that has an inner peripheral surface for frictionally engaging a vacuum hose; and a cover for sealing the opening when the vacuum hose is not in use.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

The present invention discloses an access port for a house vacuum system that is equipped with a removable trap such that debris collected during vacuuming can be easily removed, and furthermore, the jamming of the access port by debris can be avoided.

In the preferred embodiment, the present invention access port for a house vacuum system can be constructed by the major components of a port body of elongated, cylindrical shape, a port cover that is pivotally connected to a floor panel to cover an upper rim of the port body, a debris trap of elongated, cylindrical shape that fits inside and spaced-apart from the port body, a vacuum hose access port provided in the port cover, and a cover for the vacuum hose access port that is pivotally connected to the port cover by hinge means.

The port body of the present invention novel access port is generally formed in an elongated, cylindrical shape that may have either an annular or a rectangular cross-section. The port body has an open top for engaging a port cover and an apertured bottom plate in fluid communication with a vacuum source. The apertured bottom plate is used to provide a secondary filtering means for preventing large subjects from being vacuumed into the house vacuum system, and thus disabling the system. The port cover that is pivotally connected to a floor panel by a hinge has an outer dimension that is at least the outer dimension of the port body to sufficiently seal an upper rim of the port body when the port cover is closed onto the port body. The debris trap is normally formed in an elongated, cylindrical shape of either annular or rectangular cross-section, and most likely, conforming to the same cross-section of the port body. The debris trap is removably mounted inside the port body in a suspended manner wherein an upper flange of the debris trap rests on a stop provided on an inner peripheral surface of the port body. The debris trap is provided with a multiplicity of apertures in both the sidewall and the bottom plate such that debris can be collected in the trap while air is allowed to pass through into the house vacuum system. The multiplicity of apertures should have a sufficient size, i.e. should have a diameter of at least 2 mm to allow small particles to pass therethrough but filtering out larger particles. The design of the debris trap is such that even when the apertures in the bottom plate is plugged up by the vacuumed debris, the apertures in the sidewall still allows air to pass through into the house vacuum system. The vacuum hose access port that is provided in the port cover is equipped with a cover that is hinged to the port cover such that it can be pivotally opened to allow the insertion of a vacuum hose. The downwardly projecting sidewall for the access port allows a frictional engagement between an outer peripheral surface of the vacuum hose and the inner peripheral surface of the sidewall with the cover for the access port pivotally opened.

Figure 2A:
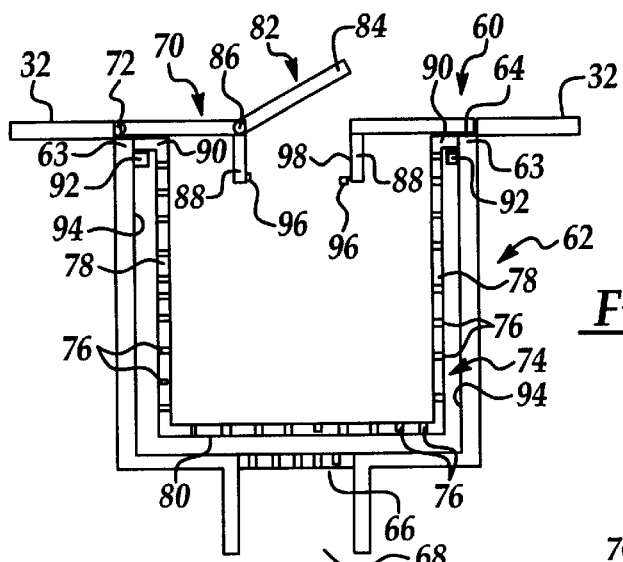
FIG. 2A is a cross-sectional view of the present invention access port for a house vacuum system equipped with a removable trap in an operating position.
Figure 2B:
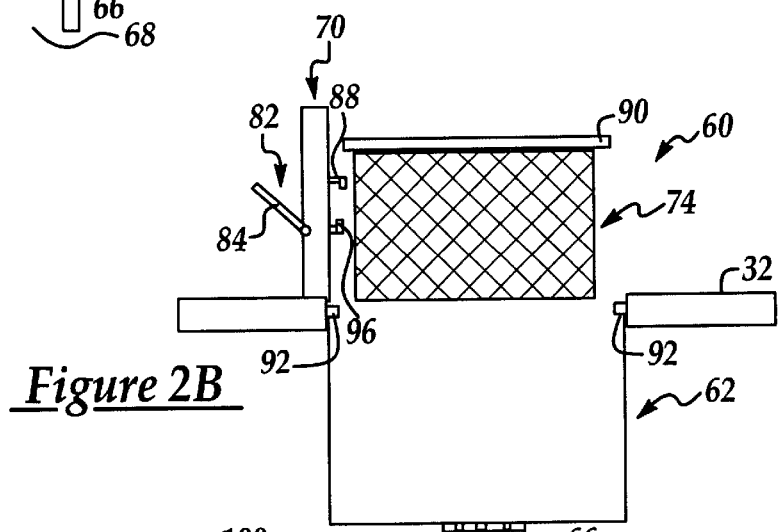
FIG. 2B is a cross-sectional view of the present invention access port of FIG. 2A with the removable trap lifted out of the port body.

A detailed view of the present invention access port for a house vacuum system and its operation are shown in FIGS. 2A and 2B. Referring to FIG. 2A, wherein a present invention access port 60 for a house vacuum system (not shown) is illustrated in a cross-sectional view. The access port 60 is constructed by a port body 62 of elongated, cylindrical shape that has an annular cross-section. The port body 62 has an open top 64 and an apertured bottom 66 that is in fluid communication with a vacuum source at a bottom end 68. A port cover 70 is pivotally connected to a floor panel 32 by a hinge 72. The port cover 70 may have an outer dimension that is at least the outer dimension of the port body 62 such that the port cover 70 sealing engages an upper rim 63 of the port body 62 when the port cover 70 is in a closed position, such as that shown in FIG. 2A. A debris trap 74 of an elongated, cylindrical shape, and has an annular cross-section to fit the cavity in the port body, is removably mounted inside the port body for collecting vacuumed debris and for allowing air to pass through a multiplicity of apertures 76 provided in both the sidewall 78 and the bottom plate 80 of the debris trap 74.

The port cover 70 further includes a vacuum hose access port 82 that includes a cover 84 for the vacuum hose access port that is pivotally connected to the port cover 70 by a hinge 86. The vacuum hose access port 82 is further equipped with a downwardly projecting sidewall 88 for frictionally engaging an outer peripheral surface of a vacuum hose (not shown) when the cover 84 is pivotally opened. The diameter of the cover 84 is substantially smaller than the diameter of the port cover 70. For instance, in a preferred embodiment, the diameter of the cover 84 is about 7.6 cm, while the diameter of the port cover is about 20 cm.

As shown in FIG. 2A, it should be noted that the debris trap 74 is further equipped with an upper flange 90 which is used to engage a stop 92 provided on an inner peripheral surface 94 of the port body 62 such that a desirable spacing in-between the debris trap 74 and the port body 62 can be maintained. A desirable spacing should be at least 0.5 cm to allow the passage of air into the lower opening 68 of the port body 62. The multiplicity of apertures 76 provided in the debris trap should have a diameter of at least 2 mm, and preferably a diameter of at least 5 mm to allow the passage of air and small particles.

A stop 96 is further provided on an inner peripheral surface 98 of the sidewall 88 for stopping the downward travel of a vacuum hose (not shown) when the hose is inserted into the sidewall 88.

Figure 1A:
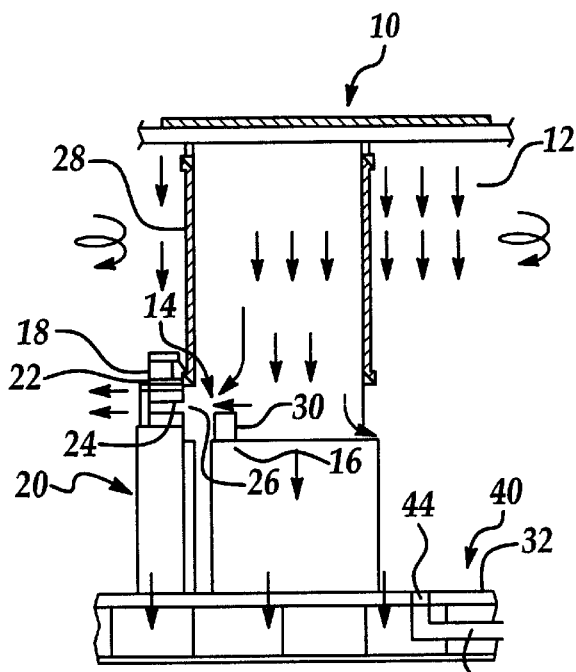
FIG. 1A is a cross-sectional view of a typical cleanroom setup with a house vacuum system in the cleanroom floor.
Figure 1B:
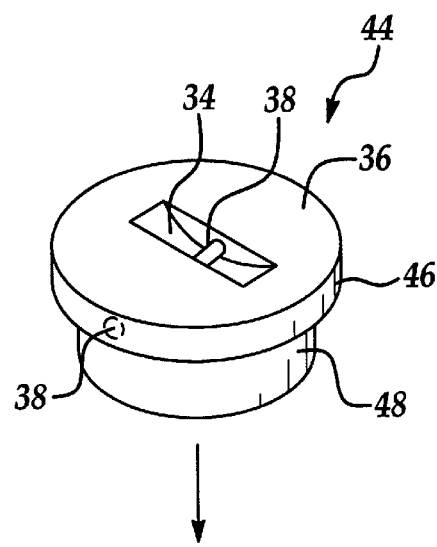
FIG. 1B is a perspective view of a house vacuum conduit and the conventional conduit cover.
Figure 1C:
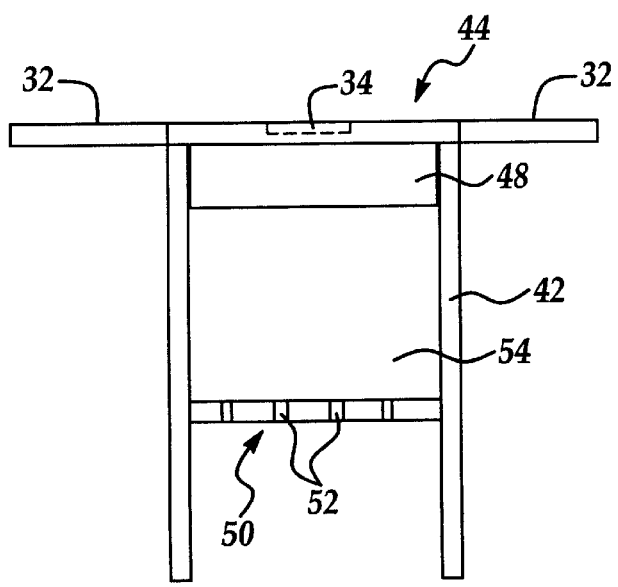
FIG. 1C is a cross-sectional view of the conduit cover of FIG. 1B installed in the vacuum conduit.

FIG. 2B is a side view of the present invention access port 60 for a house vacuum system illustrating the debris trap being removed for dumping out the vacuumed debris. After the vacuumed debris is removed from the trap 74, the trap 74 is reinstalled into the port body 62 for future usage. It should be noted that, in the present invention novel access port 60, even when the bottom of the debris trap 74 is filled with the vacuumed debris, the multiplicity of apertures 76 provided in the sidewall 78 is still available for passage of air and thus, an adequate operation of the house vacuum system. This presents a great improvement over that of the conventional access port where the bottom apertured plate 50 (FIG. 1C) can be easily plugged and render the vacuum system inoperable.

Figure 3:
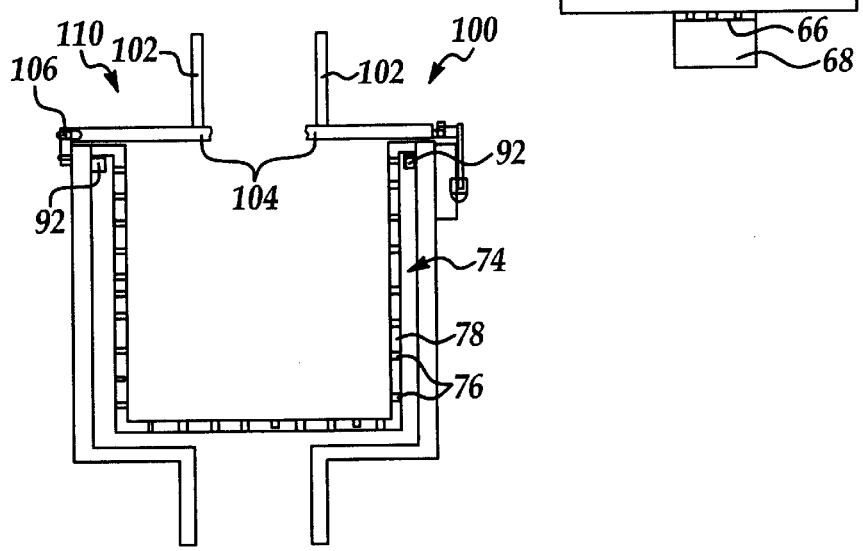
FIG. 3 is a cross-sectional view of an alternate embodiment of the present invention access port for a house vacuum system that is portable.

An alternate embodiment of the present invention novel access port 100 for a house vacuum system is shown in FIG. 3 in a cross-sectional view. In this alternate embodiment, the access port 100 is made into a portable system that can be taken from vacuum port to vacuum port in a cleanroom setup by simply removing a cover (not shown) that is in place when the vacuum is not in use. The port cover 70 of the preferred embodiment (shown in FIGS. 2A and 2B) is replaced by a port cover 110 which is equipped with an upwardly extending sidewall 102 for receiving a vacuum hose (not shown). The sidewall 102 is further provided with a stop 104 for stopping the downward travel of the vacuum hose. The portable access port 100 is similarly equipped with a debris trap 74 that is used for collecting vacuumed debris and for the easy removal of the debris when the port cover 110 is opened pivotally on hinge 106. When the portable access port 100 is not used, either a cover or a plug such as that shown in FIG. 1B can be used to seal the vacuum conduit (not shown in FIG. 3). The portable access port 100 shown in FIG. 3 can be used for saving cost such that only one portable access port can be used for serving many vacuum conduits.

The present invention access port for a house vacuum system that is equipped with a removable trap has therefore been amply described in the above description and in the appended drawings of FIGS. 2A–3.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows.

What is claimed is:

1. An access port for a house vacuum equipped with a removable trap comprising:

a port body of elongated cylindrical shape having an open top and an apertured bottom in fluid communication with a vacuum source;

a port cover pivotally connected to a floor panel by hinge means, said port cover having an outer dimension that is at least the outer dimension of said port body for sealingly engaging an upper rim of said port body when said port cover is in a closed position;

a debris trap of elongated cylindrical shape removably mounted inside said port body for collecting debris for a vacuuming operation and for allowing air to pass therethrough through a plurality of apertures provided in a sidewall and in a bottom plate of said debris trap, said debris trap is supported in a suspended manner spaced-apart from an inner periphery and said apertured bottom of said port body by a distance of at least 0.5 cm; and a cover for said vacuum hose access port pivotally connected to said port cover by a hinge means, said access port being equipped with a downwardly projecting sidewall for frictionally engaging an outer peripheral surface of a vacuum hose when said cover for the access port is pivotally opened, said cover for the vacuum hose access port having a diameter smaller than an outer dimension of said port cover.

2. An access port for a house vacuum equipped with a removable trap according to claim 1, wherein said port body and said debris trap have a circular cross-section.

3. An access port for a house vacuum equipped with a removable trap according to claim 1, wherein said outer dimension of said port cover is a diameter of said port cover.

4. An access port for a house vacuum equipped with a removable trap according to claim 1, wherein said port body further comprises a flange portion on an inner periphery of said port body for suspendedly supporting an upper flange of said debris trap.

5. An access port for a house vacuum equipped with a removable trap according to claim 1, wherein said debris trap being equipped with an outwardly extending upper flange portion extended from an upper rim of said trap.

6. An access port for a house vacuum equipped with a removable trap according to claim 1, wherein said debris trap further comprises a handle for ease of removal from said port body.

7. An access port for a house vacuum equipped with a removable trap according to claim 1, wherein said downwardly projecting sidewall on said vacuum hose access port further comprises a stop mounted on an inner periphery of said sidewall to limit the downward travel of a vacuum hose.

8. An access port for a house vacuum equipped with a removable trap comprising:

a port body of elongated cylindrical shape having an open top and an apertured bottom in fluid communication with a vacuum source;

a port cover pivotally connected to a floor panel by hinge means, said port cover having an outer dimension that is at least the outer dimension of said port body for sealingly engaging an upper rim of said port body when said port cover is in a closed position;

a debris trap of elongated cylindrical shape removably mounted inside said port body for collecting debris for a vacuuming operation and for allowing air to pass therethrough through a plurality of apertures provided in a sidewall and in a bottom plate of said debris trap, said debris trap is supported in a suspended manner spaced-apart from an inner periphery and said apertured bottom of said port body by a distance of at least 0.5 cm;

a vacuum hose access port in said port cover formed by an opening and an upwardly extending sidewall having an inner peripheral surface for frictionally engaging a vacuum hose; and a cover for sealing said opening when said vacuum hose is not in use.

9. An access port for a house vacuum equipped with a removable trap according to claim 8, wherein said port body and said debris trap have a circular cross-section.

10. An access port for a house vacuum equipped with a removable trap according to claim 8, wherein said port body further comprises a flange portion on an inner periphery of said port body for suspendedly supporting an upper flange of said debris trap.

11. An access port for a house vacuum equipped with a removable trap according to claim 8, wherein said debris trap being equipped with an outwardly extending upper flange portion extended from an upper rim of said trap.

12. An access port for a house vacuum equipped with a removable trap comprising:

a port body of elongated cylindrical shape having an open top and an apertured bottom in fluid communication with a vacuum source;

a port cover pivotally connected to a floor panel by a hinge means, said port cover having an outer dimension that is at least the outer dimension of said port body for sealingly engaging an upper rim of said port body when said port cover is in a closed position;

a debris trap or elongated cylindrical shape removably mounted inside said port body for collecting debris for a vacuuming operation and for allowing air to pass therethrough through a plurality of apertures provided in a sidewall and in a bottom plate of said debris trap, said debris trap is supported in a suspended manner spaced-apart from an inner periphery and said apertured bottom of said port body by a distance of at least 0.5 cm; and a vacuum hoes access means in said port cover for sealingly connecting a vacuum hose to a vacuum source.

13. An access port for a house vacuum equipped with a removable trap according to claim 12, wherein said vacuum hose access means comprises a vacuum hose access port in said port cover and a cover for said vacuum hose access port pivotally connected to said port cover by a hinge means.

14. An access port for a house vacuum equipped with a removable trap according to claim 12, wherein said vacuum hose access port is equipped with a downwardly projecting sidewall for frictionally engaging an outer peripheral surface of a vacuum hose when said cover for the access port is pivotally opened.

15. An access port for a house vacuum equipped with a removable trap according to claim 12, wherein said vacuum hose access means comprises a vacuum hose access port in said port cover and a cover for sealing said vacuum hose access port when said vacuum hose is not in use.

16. An access port for a house vacuum equipped with a removable trap according to claim 12, wherein said vacuum hose access port is formed by an opening and an upwardly extending sidewall having an inner peripheral surface for frictionally engaging a vacuum hose.

17. An access port for a house vacuum equipped with a removable trap according to claim 12, wherein said port body further comprises a flange portion on an inner periphery of said port body for suspendedly supporting an upper flange or said debris trap.

* * * * *